March 26, 1957     A. A. SCHREINER     2,786,516
BIFURCATED BEAD SEATING DEVICE FOR TUBELESS TIRES
Filed April 15, 1955
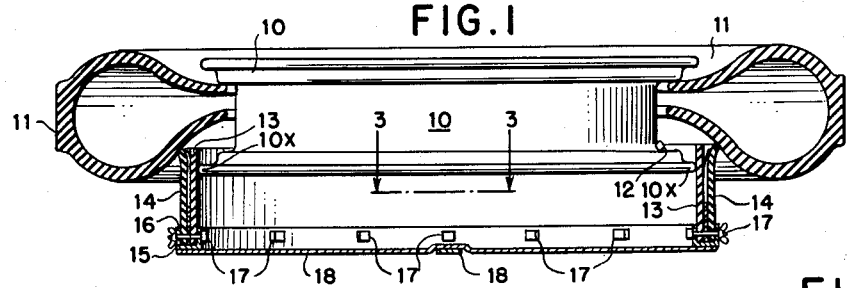
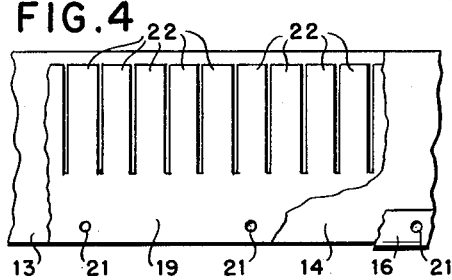
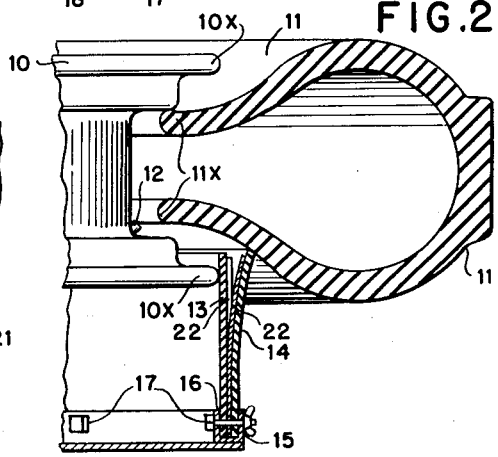
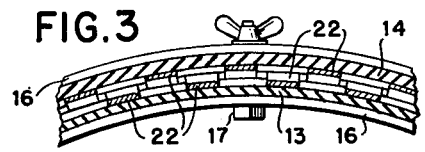
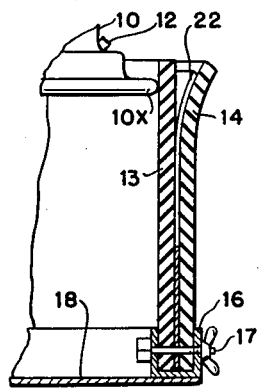
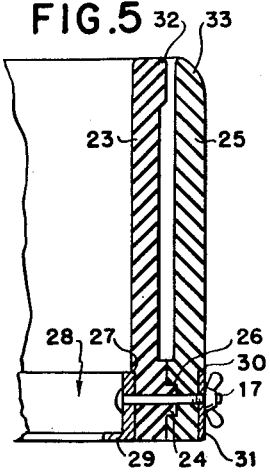
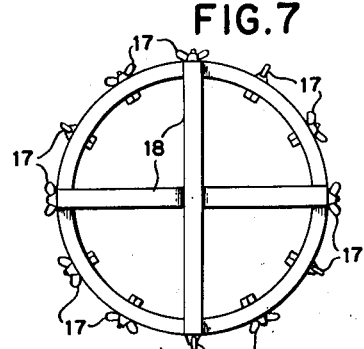
INVENTOR.
Alexander Schreiner
BY
*Frank Makara*
ATTORNEY United States Patent Office
2,786,516
Patented Mar. 26, 1957

2,786,516

BIFURCATED BEAD SEATING DEVICE FOR TUBELESS TIRES

Alexander Anthony Schreiner, Union, N. J.

Application April 15, 1955, Serial No. 501,475

6 Claims. (Cl. 157—1.1)

This invention relates to a tire mounting device for mounting tubeless tires on a co-acting steel automobile rim.

It is an object of this invention to provide a bifurcated tubeless tire mounting device of inexpensive construction.

It is another object to provide a bifurcated tire mounting device adapted to sealingly secure the steel rim simultaneously with a sealingly securing of said device to said tire.

It is another object to provide a tire mounting device made from a pair of resilient annular rings.

These and other objectives of this invention will become apparent upon reading the following descriptive disclosure taken in conjunction with the accompanying drawing in which:

Fig. 1 is a section view of a tubeless tire and a steel rim disposed upon the mounting device of this invention, Fig. 2 is a detail section view of a modified mounting device showing the manner of effecting a hermetic seal between the wheel steel rim and the tubeless tire, Fig. 3 is a bottom view of a bifurcated mounting device having a slotted metal expansion strip between the resilient bifurcated annular rings, Fig. 4 is a fragmentary view showing the slots in the expansion ring, Fig. 5 is a detailed section view of a modified mounting device showing a manner of hermetically securing together the separate bifurcated resilient rings, Fig. 6 is a modified detail section view showing the flaps of the steel expansion ring disposed outwardly against the mounting skirt that contacts the tubeless tire, and Fig. 7 is a top view of the mounting device and showing the cross-bars adapted for manual lifting of the mounting device.

Turning to the drawing a conventional steel automobile rim 10 is disposed in contact with a conventional tubeless tire to be inflatingly mounted thereon. The rim 10 is provided with a conventional air valve 12 such as are used on conventional tire inner tubes. As shown in Figs. 1 and 2 the tubeless tire is loosely mounted around the rim 10.

In order to mount the tire on the rim with a pressure seizure effected between both tire beads and the corresponding wheel rim annular sections, the bifurcated mounting device of this invention is employed.

The mounting device of this invention is made from two separate resilient, preferably rubber rings, an inner ring 13 adapted to contact the steel rim bead 10X and an outer ring 14 adapted to contact the exterior wall of the tubeless tire 11 (Figs. 1 and 2). Rings 13 and 14 are hermetically secured together.

In operating the device of this invention the bifurcations are disposed upwardly and the rim and tire are placed co-actingly upon the bifurcations to effect a hermetic seal between the rim, tire and the mounting device (Figs. 1 and 2). By mounting the rim and tubeless tire upon the bifurcations the combined weight of the rim and tire help to effect a tight hermetic seal to the respective bifurcations i. e. inner ring and the outer ring of the mounting device.

Of course the tire and rim could be placed upon the ground and the mounting device placed securingly thereover in air-tight relationship if so desired. In any case, after the mounting device is suitably disposed adjacent both the said steel rim 10 and the tire 11 an air hose (not shown) is disposed in the inner space of rim 10 and to the inlet orifice (not shown) of air valve 12. Passage of compressed air through valve 12 fills the interior of tire 11 while the mounting device continuously traps the air between said rim and said tire. With the passage of sufficient compressed air into the tire the tire beads 11X move outwardly until they lockingly and sealingly engage the corresponding rim beads 10X at which time the air pressure in the tire is sufficient to support the weight of the car.

There are several means of hermetically securing ring 13 to ring 14. As shown in Fig. 1 a U-shaped annular metal ring 15 is used in which the base or bottom section of the adjacently disposed rings are snugly deposed. The opposed side walls 16 of the U-shaped ring 15 are apertured in opposed linear relationship. Similarly each of the resilient rings 13 and 14 are provided with equally spaced-apart apertures to effect linear alignment of all the apertures of the rings 13 and 14 among themselves as well as with the equally and similarly spaced apart apertures of side walls 16 of U-shaped ring 15. A plurality of conventional bolt and wing nut assemblies 17 are disposed through the respective alignment of apertures of the U-shaped ring 15 and the co-acting apertures of resilient rings 13 and 14. The wing nuts 17 are then tightened until a secure hermetic seal is effected between rings 13 and 14 so secured, the rings then may be moved as a unit. To effect easy manual lifting of the mounting device a pair of cross-bars 18 may be welded to the U-shaped ring 16 preferably at 90 degrees or otherwise secured thereto.

As shown in Fig. 1, the outer ring 14 is preferably flared outwardly at its top to effect a secure contact to the tire 11.

In a modification of this invention a ring of sheet steel 19 (Fig. 4) having a plurality of regularly spaced-apart slots therein is disposed between resilient rings 13 and 14.

To secure steel ring 19 between and to resilient rings 13 and 14, the base or unslotted section of ring 19 is provided with regularly spaced-apart apertures 21 adapted to register with the identical regularly spaced-apart apertures of rings 13 and 14. Thereby permitting wing nut assemblies 17 to be securingly passed through said co-acting assembled U-shaped ring 15, resilient rings 13 and 14, and the steel expansion ring 19 disposed therebetween.

The expansion ring 19 may have its spring-like finger flaps 22 disposed alternately in opposite directions thereby urging the inner ring 13 inwardly against rim bead 10X and simultaneously urging outer ring 14 against tire 11 (Fig. 2).

Alternatively all the spring fingers 22 may be deposed outwardly against outer resilient ring 14 to effect a tight seal against the tire carcass wall.

In Fig. 5 there is shown a modified manner of securing the annular bifurcation rings together to effect a hermetic seal therebetween.

In this modification (Fig. 5) the inner resilient ring 23 is provided with an offset protruding base section having an annular locking ledge 24 thereon. The outer ring 25 in this modification (Fig. 5) is provided with a base having co-acting annular channel 26 adapted to snugly receive ledge 24.

Preferably but optionally the inner ring 23 is provided with a recess 27 to receive an inner metal ring 28 having an annular leg 29. Also outer ring 25 may be provided with a recess 30 adapted to receive a metal ring 31.

Metal rings 28 and 31 as well as the base sections of resilient rings 23 and 25 are provided with equally spaced apart apertures adapted to effect alignment, thereby permitting wing nut assemblies 17 to be secured therethrough. Preferably the apertures in rings 23 and 25 pass through the ledge 24 of ring 23 and the corresponding channel 26 of ring 25. In operation wing nuts 17 (Fig. 5) are tightened thereby hermetically sealing the separate rings 23 and 25 together in hermetic relationship.

Advantageously, though optionally, the top of inner ring 23 may be provided with a ridge 32 integral with the top thereof and disposed away from the steel rim contacting surface to give rigidity to this section of the ring and thereby prevent blowing out of the inner ring 23 over the rim bead 10X during the mounting process when the compressed air reading becomes great. Also advantageously, the outer ring 25 may be provided with a curvature top 33 to permit an easy air-sealing and sliding movement of top 33 over and against tire 11.

This invention has been described by means of a plurality of embodiments but other embodiments clearly fall within the generic scope of two separate resilient skirts being hermetically secured together to form a tire mounting device, and all these embodiments are intended to be covered by the claims herein.

I claim:

1. A bifurcated tubeless tire bead seating device comprising an inner resilient ring having a cylindrical wall adapted to slidingly and snugly engage the peripheral edge of a steel automobile rim at a right angle to the plane thereof, a separate resilient outer ring adapted to engage the side wall of a tubeless tire loosely mounted on said rim, and annular means for securing one edge of said first ring to a corresponding edge of said second ring circumferentially in air-tight relationship.

2. The device of claim 1 wherein said annular means is a U-shaped ring disposed over the contacting edges of said resilient rings.

3. The device of claim 1 where said annular means comprises a ledge disposed integrally on said inner ring edge and a co-acting channel adapted to receive said ledge disposed in the corresponding edge of said outer ring.

4. The device of claim 1 comprising a slotted rigid ring having a plurality of flaps disposed between said resilient rings, said flaps being disposed against at least one of said resilient rings.

5. The device of claim 4 wherein all the flaps are disposed against said outer resilient ring.

6. The device of claim 4 wherein the flaps are alternately disposed against both the inner and the outer resilient rings.

References Cited in the file of this patent

UNITED STATES PATENTS

| | | |
|---|---|---|
| 2,304,581 | Lyon | Dec. 8, 1942 |
| 2,597,550 | Tritt | May 20, 1952 |
| 2,697,252 | Clark | Dec. 21, 1954 |